United States Patent [19]
Welland et al.

[11] Patent Number: 5,648,738
[45] Date of Patent: Jul. 15, 1997

[54] READ CHANNEL HAVING AUTO-ZEROING AND OFFSET COMPENSATION, AND POWER-DOWN BETWEEN SERVO FIELDS

[75] Inventors: David R. Welland, Austin, Tex.; William G. Bliss, Thornton, Colo.

[73] Assignee: Cirrus Logic, Inc., Fremont, Calif.

[21] Appl. No.: 333,488

[22] Filed: Nov. 1, 1994

[51] Int. Cl.[6] .................................................. H03L 5/00
[52] U.S. Cl. ........................ 327/307; 327/551; 327/95
[58] Field of Search ................................. 327/65, 67, 78, 327/79, 87, 91, 94, 95, 307, 337, 551

[56] References Cited

U.S. PATENT DOCUMENTS

| | | | |
|---|---|---|---|
| 4,523,107 | 6/1985 | Peterson | 327/95 |
| 5,028,815 | 7/1991 | Van De Plassche | 327/307 |
| 5,168,179 | 12/1992 | Negahban-Hagh | 327/307 |
| 5,391,937 | 2/1995 | Baggini et al. | 327/78 |
| 5,410,269 | 4/1995 | Ohie et al. | 327/95 |
| 5,459,679 | 10/1995 | Ziperovich | 364/602 |

OTHER PUBLICATIONS

"A 27 MHz mixed analog/digital magnetic recording channel DSP using partial response signalling with maximum likelihood detection", Schmerbeck, et al, IEEE International Solid-State Circuits Conference; 1991 pp. 136–137 No Month.

*Primary Examiner*—Toan Tran
*Attorney, Agent, or Firm*—Blakely, Sokoloff, Taylor & Zafman LLP

[57] ABSTRACT

A read channel especially suited for disk drives, the read channel having auto-zeroing and offset compensation operative with sufficient speed to allow powering-down much of the read channel electronics between servo fields when a read operation is not being executed, is disclosed. Auto-zeroing is accomplished by temporarily shorting what would have been the signal received from a pre-amplifier, and charging capacitors in feedback loops temporarily switched in-circuit in the various circuits being auto-zeroed. After auto-zeroing, any remaining offset, including that imposed by an analog-to-digital converter converting the analog read signal to digitized samples of the read signal, is removed by filtering the digitized read signal samples by a digital filter acting as a low pass filter (integrator and lossy integrator in the embodiment disclosed), and reconverting the digital output of the filter to analog form for subtraction from the input to the analog-to-digital converter. Other aspects of the invention are also disclosed.

26 Claims, 10 Drawing Sheets

READ CHANNEL HAVING AUTO-ZEROING AND OFFSET COMPENSATION, AND POWER-DOWN BETWEEN SERVO FIELDS

BACKGROUND OF THE INVENTION (1) Field of the Invention

The present invention relates to the field of read channel electronics for processing the analog signal from thread head of a storage device, such as a magnetic media storage device, and the conversion thereof to digital form.

(2) Prior Art

In a magnetic disk storage system, each disk is organized in tracks and sectors. A track is an annular region of a given radius and a small but finite radial width. A sector, on the other hand, is a portion of a track representing the storage of the smallest unit of user data that the host computer system can access. In general, the disk will contain a large number of concentric tracks, the tracks being as narrow and as closely spaced as possible consistent with the ability to locate and read and write individual tracks without interference with or from adjacent tracks.

In an embedded servo disk drive, the tracks are physically pre-defined at the time of manufacture of the disk drive system by the placement (recording) of signals generally referred to as servo field signals at various positions around each track. Data, on the other hand, is recorded and read between servo fields, the sector data being readable and writeable at the appropriate positions between the servo fields, and a servo field being readable by the same read/write head when the read/write head passes over a pre-recorded servo field. The servo fields are positioned in such a way that the position of the head relative to the center lines of the nearest track can be determined from reading the servo field signals, independent of where the head is between tracks. Also errors in positioning the head on the center of a track can be accurately detected so that corrections in head position may be quickly made.

Figure 1:
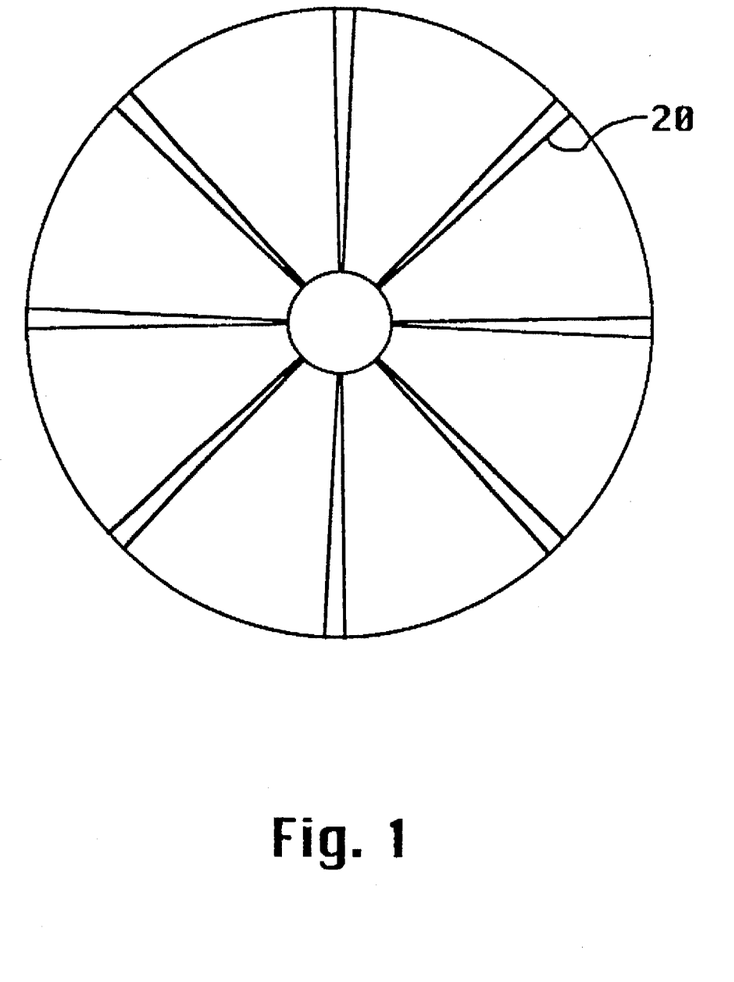
FIG. 1 illustrates the general layout of a typical magnetic disk.

The general layout of a typical disk is shown schematically in FIG. 1. This Figure illustrates eight servo field regions 20, each in a respective thin pie-shaped region on the disk. More typically, the actual number may be on the order of approximately 50. By way of a specific example, if 48 servo field regions are used, the beginning of the next servo field region will occur 7.5° after the previous one begins, so that head position corrections on a track may be made every 7.5° of rotation of the disk. Still, even with such a large number of servo field regions, only a small percentage of the disk area is devoted thereto, most of the rest being available for the storage of sector information, data, and error detection and correction information.

Prior art computer systems ranging from desk-top computers on up typically would maintain the disk drive system fully operational whenever the computer was on. With the advent of battery-powered lap-top computers and the like, the available battery energy is limited, and accordingly some prior art battery-operated computers can be set to only start the disk drive when a disk operation was called for, and if not followed within a given length of time by another disk operation, to automatically shut down the entire disk drive to preserve power. In the present invention however, the ability of the read channel electronics to turn on and stabilize very quickly in accordance with certain aspects of the invention allows the same to be partially powered down between servo fields to save energy, in spite of the fact that the servo fields are typically only a fraction of a millisecond apart. This, together with the continual reduction in physical size of disk drives and the corresponding reduction in motor power consumption in spite of steadily increasing drive storage capacities, reduces the power consumption of an operating disk drive when it is not reading, yielding higher performance battery-operated systems as well as non battery-operated systems.

BRIEF SUMMARY OF THE INVENTION

A read channel especially suited for disk drives, the read channel having auto-zeroing and offset compensation operative with sufficient speed to allow powering-down much of the read channel electronics between servo fields when a read operation is not being executed, is disclosed. Auto-zeroing is accomplished by temporarily shorting what would have been the signal received from a pre-amplifier, and charging capacitors in feedback loops temporarily switched in-circuit in the various circuits being auto-zeroed. After auto-zeroing, any remaining offset, including that imposed by an analog-to-digital converter converting the analog read signal to digitized samples of the read signal, is removed by filtering the digitized read signal samples by a digital filter acting as a low pass filter (integrator and lossy integrator in the embodiment disclosed), and reconverting the digital output of the filter to analog form for subtraction from the input to the analog-to-digital converter. Other aspects of the invention are also disclosed.

DETAILED DESCRIPTION OF THE INVENTION

Figure 2:
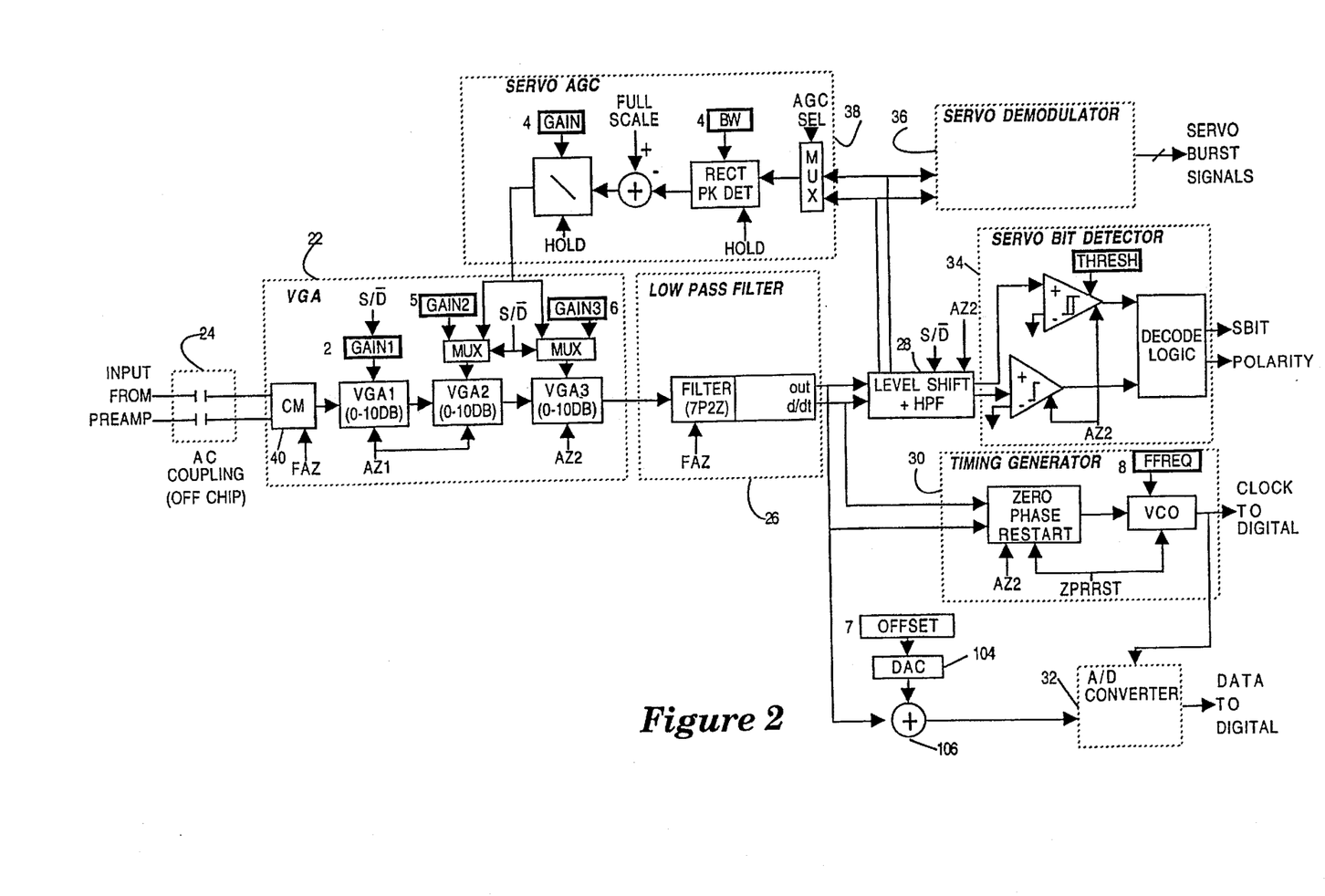
FIG. 2 is a block diagram of portions of an integrated circuit read channel in accordance with the present invention.

Now referring to FIG. 2, a block diagram of portions of an integrated circuit read channel in accordance with the present invention may be seen. The output of the head when reading the disk is amplified by a pre-amplifier and coupled to a variable gain amplifier circuit 22 through AC coupling capacitors 24, the pre-amplifier and the coupling capacitors 24 in the preferred embodiment being off-chip. The output of the variable gain amplifier circuit 22 is coupled to a low pass filter 26, the output of which is connected to a level shifter and high pass filter 28, a timing generator circuit 30 and coupled to a circuit 32, generally identified as an analog-to-digital converter circuit, through a summing point 106. (See FIG. 11 and the description thereof for a more detailed explanation of the coupling of the low pass filter 26 to the A/D converter 32.) While any prior art timing recovery circuit may be used, the timing generator 30 used with the preferred embodiment of the invention is generally in accordance with the timing recovery circuit disclosed in a co-pending U.S. patent application entitled Timing Recovery Circuit For Synchronous Wave Form Sampling, filed Sept. 30, 1992 as Ser. No. 07/954,350, the disclosure of which is also incorporated herein by reference.

The level shift and high pass filter 28 is connected to the servo bit detector 34, the servo demodulator 36 and the servo automatic gain control (AGC) circuit 38, which in turn provides an automatic gain control signal to the variable gain amplifier (VGA) circuit 22 used during the period of each servo field.

Referring now more specifically to the variable gain amplifier circuit 22 of FIG. 2, a common mode (CM) circuit 40 responsive to a signal FAZ (described in greater detail later) has the capability of disconnecting the signal input to the first stage of the variable gain amplifier, namely VGA1, and zeroing the differential input to the amplifier. The entire variable gain amplifier comprises, in the preferred embodiment, three stages, namely VGA1, VGA2, and VGA3 coupled in series. The first stage of the variable gain amplifier VGA1 is digitally switchable between two gains, both set by a two bit gain control, selected by a Servo Gate signal (S/$\overline{D}$) which is high when in the servo mode and low when in the data mode. The gains of the second and third stages, VGA2 and VGA3, are similarly selected by the Servo Gate signal S/$\overline{D}$. However for these two stages during the servo field, the gain of each of the two amplifiers is determined by the output of the servo AGC circuit 38, which starting with the gain from the preceding servo field, makes adjustments in the gain of the two stages for servo field automatic gain control purposes. During the data period, the gain of the second stage of the variable gain amplifier VGA2 is determined by a pre-determined five bit gain control word, with the gain of the third stage of the variable gain amplifier VGA3 being determined by a six bit gain control signal derived from the amplitude of the digital data output from the analog-to-digital converter circuit 32, thereby providing an automatic gain control feedback during the data period also.

Figure 3:
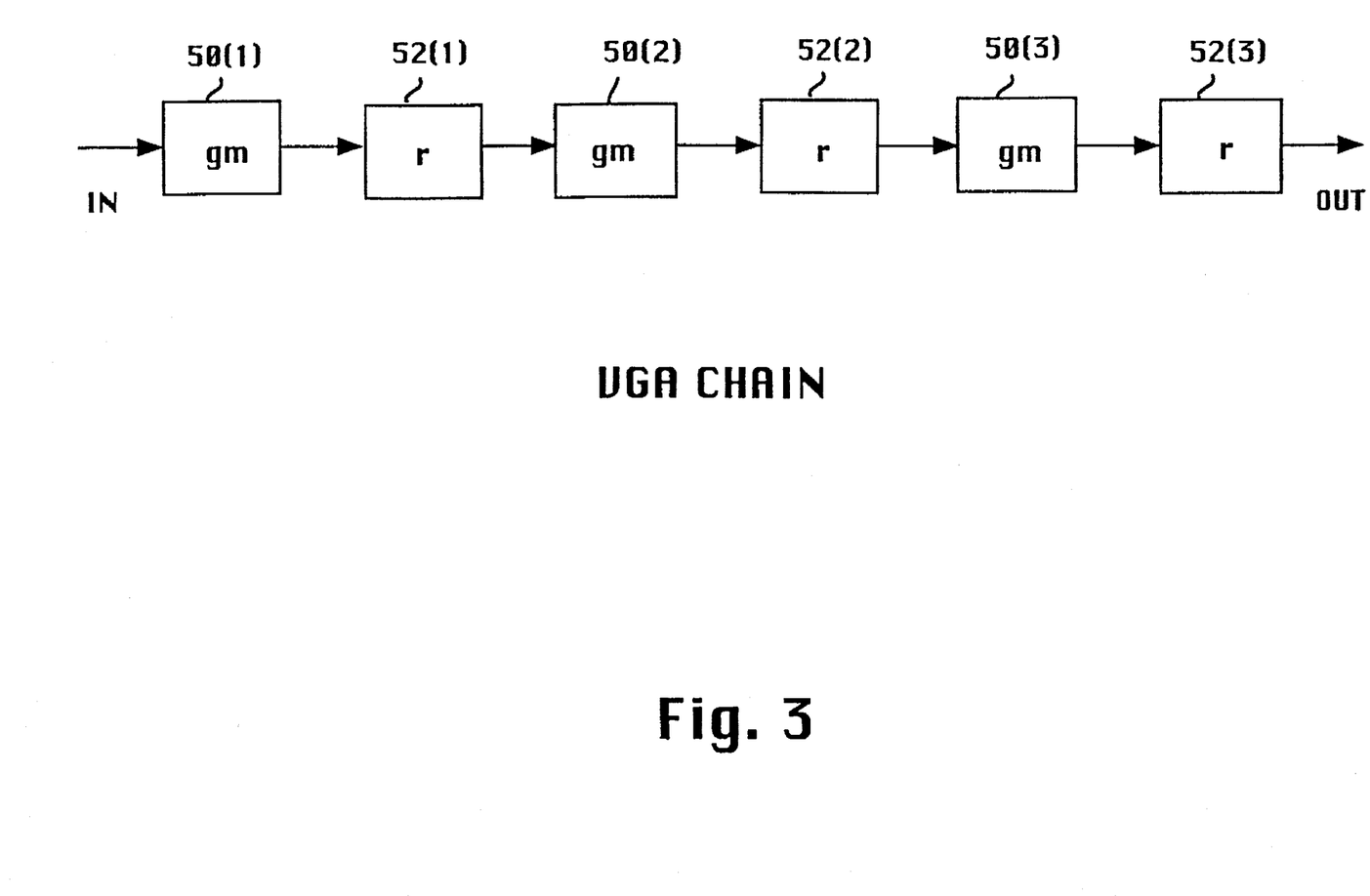
FIG. 3 is a block diagram illustrating the variable gain amplifier chain of FIG. 2.

The variable gain amplifier chain may be schematically represented as shown in FIG. 3 as three transconductance amplifiers 50 (1), 50 (2) and 50 (3), each operative into a resistive load circuit 52 (1), 52 (2) and 52 (3), respectively. Each transconductance amplifier provides a two line differential current output in response to a two line differential voltage input, the differential current output being converted to a differential voltage for each transconductance amplifier by the following resistive circuit. Accordingly, the combination of each transconductance amplifier and following resistive circuit provide a voltage-to-voltage gain. In addition however, each amplifier stage, being imperfect, injects an offset into the following stage and/or following circuitry, which offsets are undesirable because they limit the dynamic range of the circuitry, and for the further reason that the offsets cause and accentuate nonlinearities and other errors in the operation thereof. Also, in the preferred embodiment, a partial response, maximum-likelihood (PRML) detector is used to detect data. While such detectors are normally not particularly sensitive to offsets, a preferred embodiment of the present invention uses a reduced complexity Viterbi-type PRML sequence detector of the type disclosed in U.S. Pat. No. 5,291,499, which detectors are more sensitive to offsets, so that good offset cancellation is required. In the prior art, to overcome these problems, large off-chip coupling capacitors were used between stages which provided the desired AC coupling, but blocked coupling of the DC offsets of the various circuits. (The SSI 32P4731/41 Read Channel with 1,7 ENDEC, 4-burst servo, manufactured by Silicon Systems of Tustin, Calif. is an example of a prior art integrated circuit requiring numerous such off-chip coupling capacitors.)

In the present invention however, one of the important aspects of the invention is the ability to power down much of the read channel electronics between servo fields (unless a read operation is actually being carried out), when not servoing, and even in gaps between fields, thereby saving circuit operating power and reducing associated heating, yet still allowing the reading of the servo fields and data fields. Accordingly, the use of large coupling capacitors external to the chip is not appropriate in the present invention, as the same take too long to stabilize to allow shutting down and restarting of the circuit between fields.

In the present invention, the variable gain amplifier stages and the low pass filter are direct coupled, eliminating the off-chip coupling capacitors of the prior art and thereby avoiding large power-up time constants. This allows much of the read channel electronics to be shut off between servo fields and data fields, and very rapid stabilization of the circuit on power-up at or just before the next servo or data field to be read. To accomplish this however, the DC offsets amplified at each stage of the variable gain amplifier stages, and in various other circuits yet to be described, must be substantially eliminated to minimize circuit distortion and minimize detection errors in the partial response, maximum-likelihood detection used in the preferred embodiment.

Figure 4:
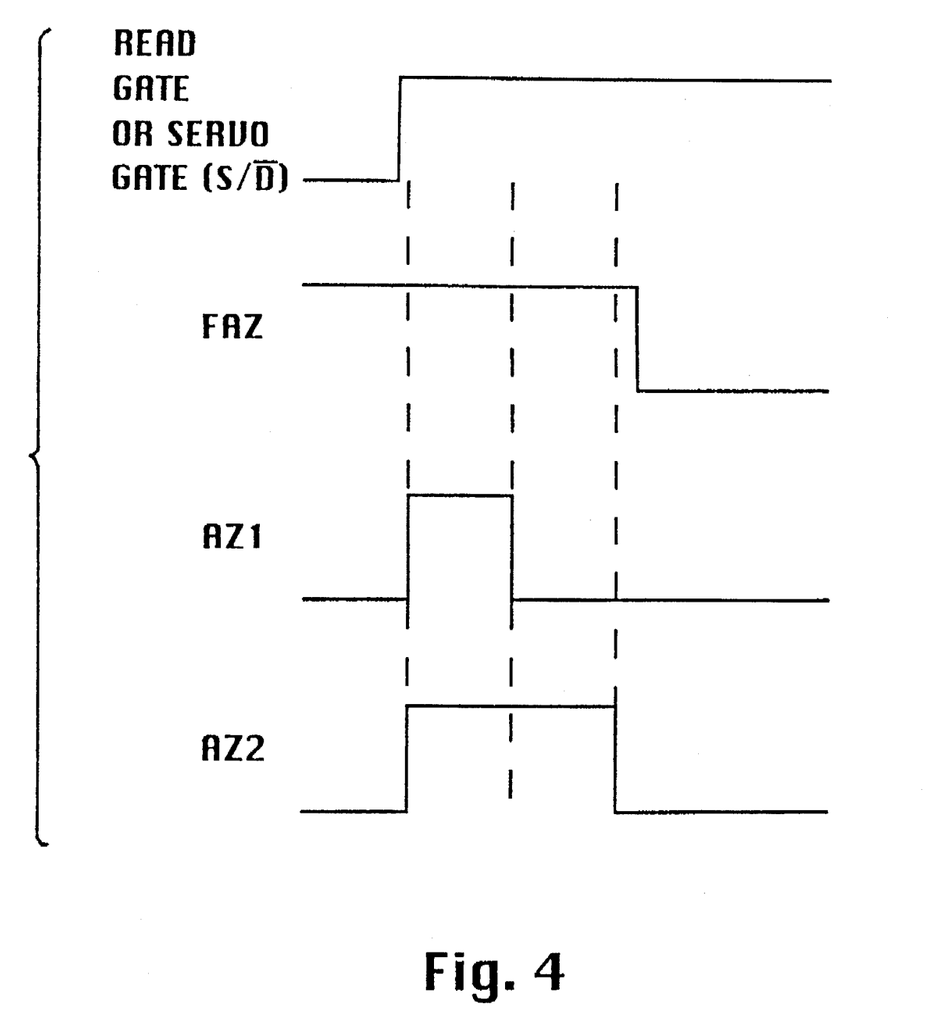
FIG. 4 is a wave form diagram illustrating the timing of the auto-zero signal components comprised of auto-zero signals FAZ, AZ1 and AZ2.
Figure 5:
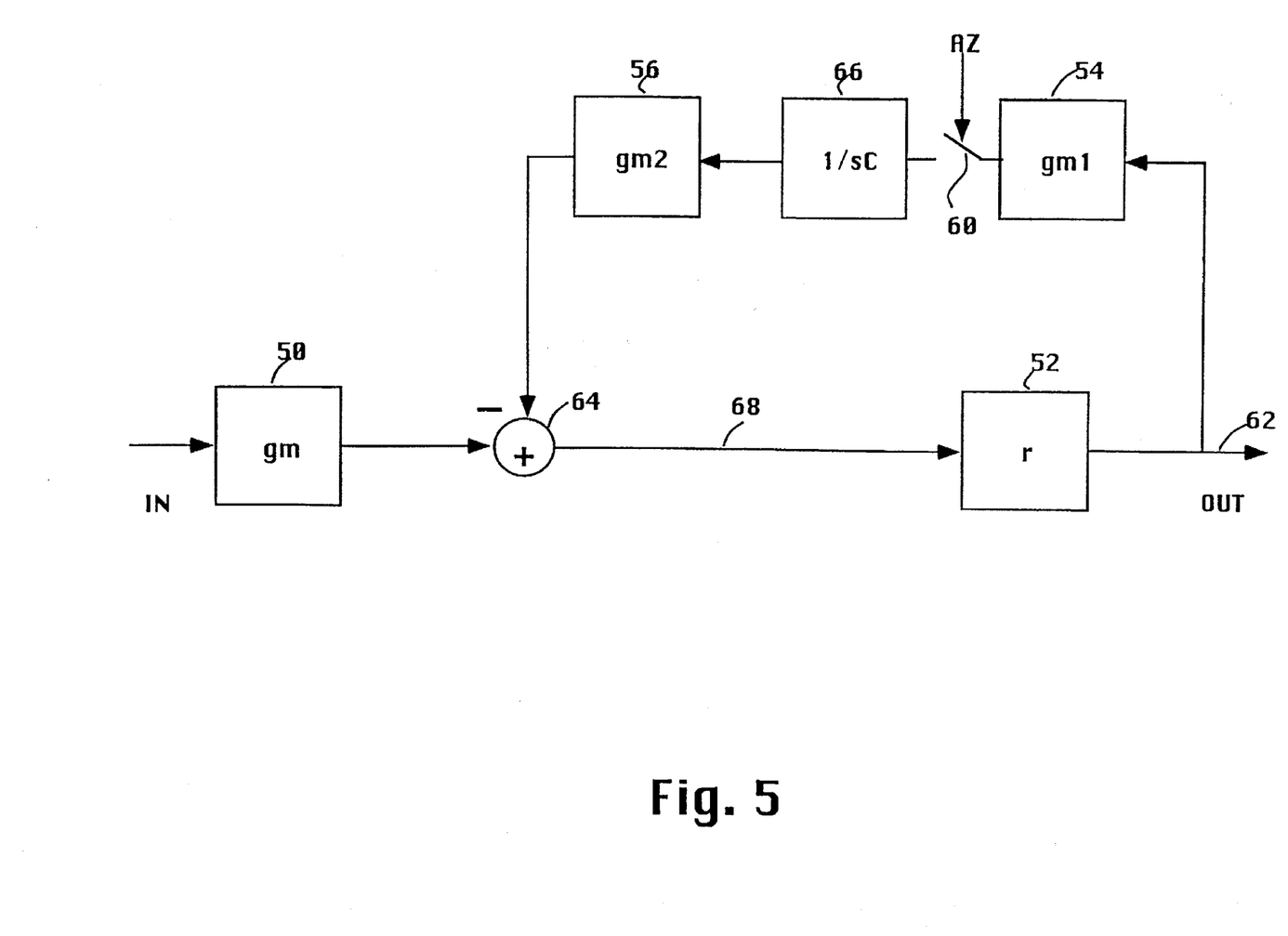
FIG. 5 illustrates a representative stage of the variable gain amplifier circuit comprised of a transconductance stage and a resistive stage 52, together with a feedback circuit comprising additional transconductance stages, an impedance (integrator) 1/sC and an AZ switch.
Figure 6:
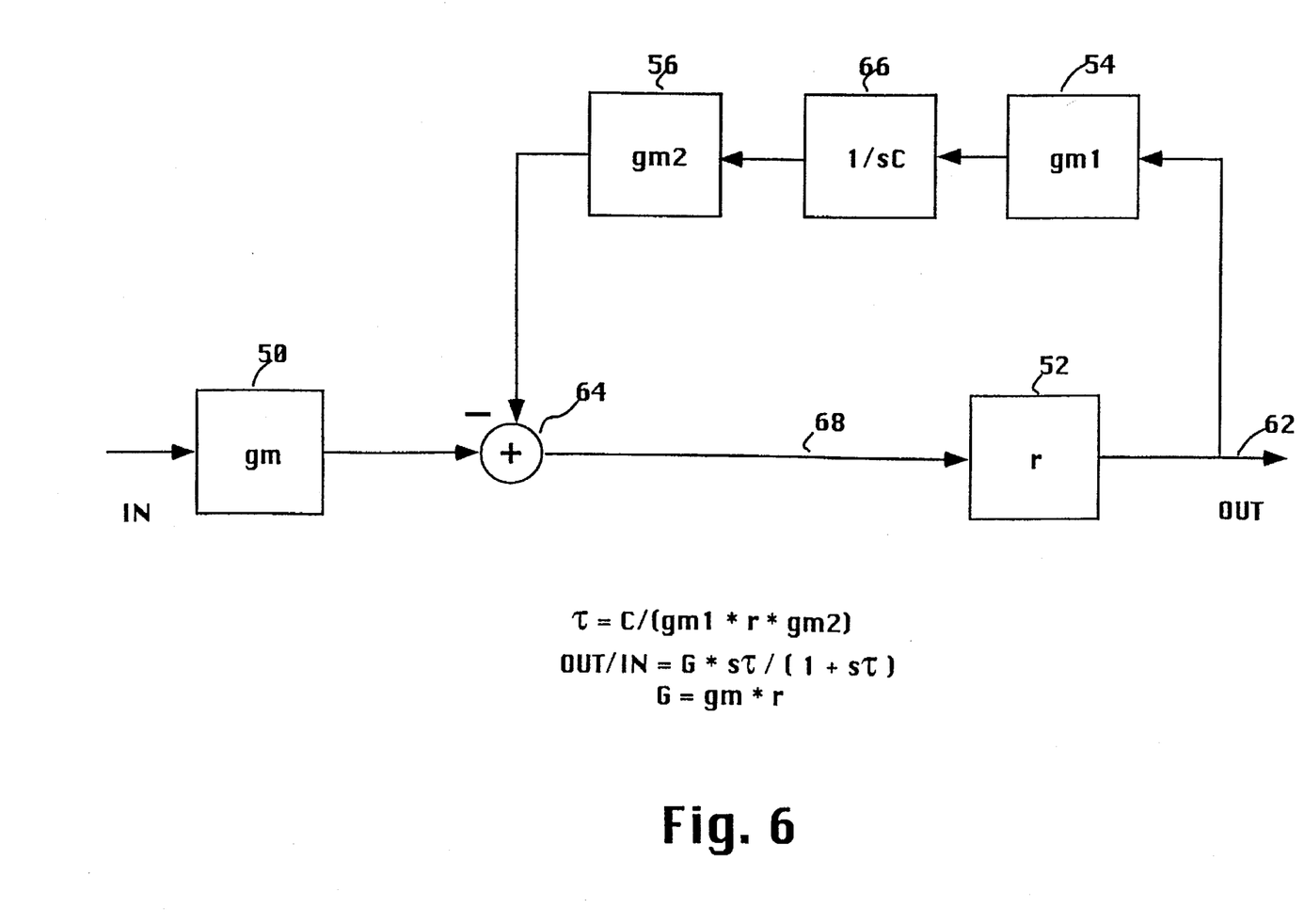
FIG. 6 is a diagram similar to FIG. 5 with the AZ switch closed.
Figure 7:
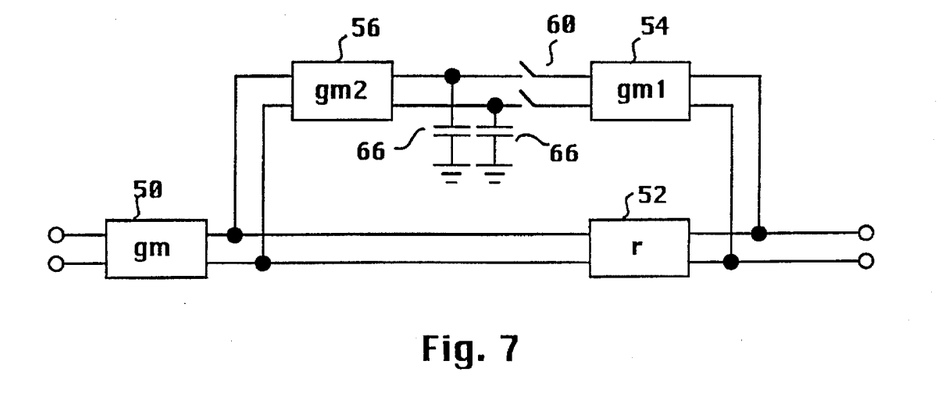
FIG. 7 is a block diagram which illustrates the two-line differential signal paths and the integrating capacitors 66 of the diagram of FIG. 5.
Figure 8:
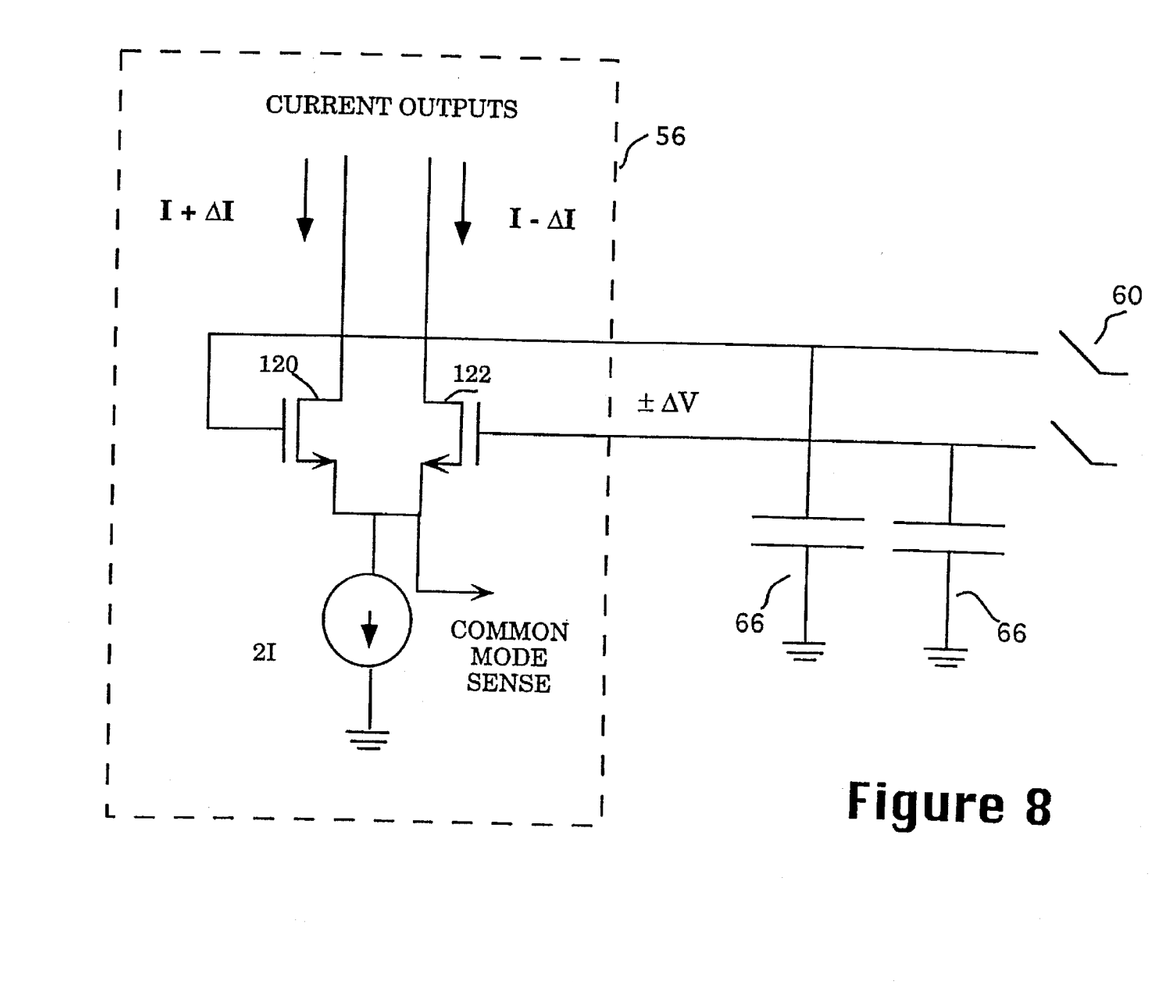
FIG. 8 is a circuit diagram for the transconductance amplifier 56 of FIGS. 5 through 7.

The auto-zero process is controlled by auto-zero signals FAZ, AZ1 and AZ2 shown in FIGS. 2 and 4. As may be seen in FIG. 4, at the appropriate time for reading a servo or data field, the Servo or Read Gate, respectively, is asserted. At this time the auto-zero signal FAZ has already been asserted, which signal disconnects the input from the normal input and zeros the input of VGA1 (FIG. 2) so that the offsets in the subsequent circuitry may be measured and thereafter substantially eliminated. Each stage of the variable gain amplifier circuit 22 as described with respect to FIG. 3 is comprised of a transconductance stage 50 and a resistive stage 52, shown generally in FIGS. 5, 6 and 7, and more specifically in FIG. 7. In addition however, each variable gain amplifier stage also includes a feedback circuit, shown schematically in FIGS. 5, 6 and 7 as additional transconductance stages 54 and 56, an impedance (integrator) 1/sC 66 (capacitors 66 in FIG. 7) and an auto-zero switch 60. For the variable gain amplifiers VGA1 and VGA2, the transconductance stage 54 of FIGS. 5, 6 and 7 is really part of the transconductance stage of the immediately following variable gain amplifier, more specifically, outputs taken from additional current mirrors attached to the output current mirrors of the forward path transconductance amplifiers, details of which will be subsequently described. For the third variable gain amplifier VGA3, the transconductance stage 54 in the feedback loop is of similar design to the forward loop transconductance stages. The transconductance stage 56 is also a fixed transconductance stage, more specifically comprising a differential pair as illustrated in FIG. 8. As shown therein, the gates of MOSFET devices 120 and 122 are coupled to the capacitors 66, with the common source connection of the MOSFET devices being coupled to a current source. The differential voltage on the gates of devices 120 and 122 causes the desired negative feedback differential currents I+ΔI and I−ΔI for feedback to the forward signal path. Also the common source connection of devices 120 and 122 provides a sensing point for the common mode voltage for common mode voltage control of the capacitors 66. Such common mode control circuits are several generally well known in the prior art and accordingly are not further described herein.

The differential output on line 62 (FIG. 5) is zeroed in the following manner. In normal operation, the auto-zero switch 60 (FIG. 5) is open. However, when the auto-zero switch 60 is closed as shown in FIG. 6, during which time the common mode circuit 40 (FIG. 2) zeros the differential input signal to the first stage VGA1 of variable gain amplifier 22, the output on line 62 of VGA1 (see FIG. 6 showing a VGA stage) is fed back through the transconductance stage 54 to the integrator 66. The output of integrator 66 is fed back through the transconductance stage 56 to the summing point 64 in the forward signal path. In essence, when the switch is closed, the output on line 62 is a voltage which is fed back through transconductance stage 54 to provide current to the integrator (capacitor) 66. The voltage across the capacitor in turn is applied to transconductance stage 56 which provides a negative feedback output current to the summing point 64 in the forward signal path 68. Integrator 66 integrates the differential voltage on lines 62 and provides a canceling differential current to the summing point 64, the integrators 66 increasing in voltage until the differential output on lines 62 is driven essentially to zero, at which time there is no further error signal to integrate. As to the second stage VGA2, which like VGA1 is also auto-zeroed by auto-zero signal AZ1, it too will auto-zero in a similar manner, though not with a zero differential input thereto, but rather with the residual offset of VGA1 as the input to VGA2. The auto-zeroing of VGA2 will leave only the residual offset of VGA2 (rather than including the residual offset of VGA1 times the gain of VGA2), and the auto-zeroing of VGA3 responsive to the signal AZ2 will similarly yield only the residual offset of VGA3, all subject however to the transients introduced on the opening of the auto-zeroing switches discussed hereafter.

The time constant T of each of these feedback loops is given by the following equation:

$$\tau = C/(gm1*r*gm2)$$

By appropriate selection of the capacitor value and of the gains of the transconductance amplifiers, the time constant may be chosen so that the feedback circuit settles quickly. When the auto-zero switch 60 is again opened, the capacitors maintain their voltages throughout the rest of the servo or data field, canceling the offset that otherwise would have appeared as a result of offsets in the forward signal path of the circuit.

In a preferred embodiment, the time constant τ is on the order of tens of nanoseconds. This is to be compared to the gap between the servo and data fields in a typical disk drive, which is on the order of 1 microsecond. It is this very rapid settling time for the auto-zeroing process which allows the shutting down of a substantial portion of the read channel electronics during the gaps and restarting the same at the end thereof.

With respect to the extent of the offset cancellation, note that without the feedback loops (FIGS. 5, 6 and 7), the input offset of the transconductance stage 50 of VGA1 will be multiplied by the gain of its transconductance stage 50 and the resistance of its resistance stage 52, providing a substantial offset voltage on the output 62 of VGA1. This in turn would be multiplied by the gains of VGA2 and VGA3, providing a very high output offset, if not driving VGA3 to saturation.

On the other hand, with the auto-zero switch in each feedback loop closed for a very short time adequate to allow the respective circuit to settle, the voltage on the integrators 66 will stabilize when the voltage on line 62 is equal to the input offset voltage of the respective transconductance stage 54. In each loop, the input offset voltage of transconductance stages 50 and 54 will be of the same general order of magnitude, so that the effect of the auto-zeroing is to convert what would be an input offset voltage for the variable gain amplifier stage, which input offset voltage would have been multiplied by the gain of the stage and each subsequent stage, to a variable gain amplifier output offset equal to an unamplified transconductance amplifier input offset, namely that of transconductance stage 54. Furthermore, by allowing the remaining offset to pass to the next stage during its auto zero, it too is canceled.

The actual circuit is more representatively shown in the block diagram of FIG. 7, which illustrates the two-line differential signal paths and the integrating capacitors 66. In the preferred embodiment, the various circuits are realized in integrated circuit form using complementary MOS (CMOS) devices. The capacitors 66 in such a CMOS process can be realized as MOS devices having source and drain regions connected to ground, with the gate region overlapping the channel formed between the source and drain regions. Since one terminal of these capacitors in the feed back loops is already grounded, stray capacitance to ground is of no consequence. This is to be compared with the alternative of using forward path coupling capacitors, wherein the signal passes through the capacitor and both capacitor connections must be isolated from ground. This gives rise to a significant stray capacitance to ground, the size of which is process dependent, which stray capacitance acts as a load to the previous stage.

Further, because the auto-zeroing switches 60 (FIG. 7) are themselves MOS devices, there will be some capacitive coupling of the switching signal to capacitors 66 when the auto-zeroing switches are opened. However, the switching devices, being substantially identical devices, will inject charge approximately equally to both capacitors. This common mode capacitive coupling is of no first order consequence, as the useful forward signals and the offsets being zeroed by the auto-zeroing process are differential signals, not common mode signals. Further, referring again to FIGS. 2 and 4, it will be noted that the first two transconductance stages VGA1 and VGA2 are auto-zeroed by the signal AZ1, and the third stage VGA3 is auto-zeroed by the signal AZ2, which extends for approximately twice the time period of AZ1. To the extent that the switching devices are not identical, the opening of the switches in each feedback loop will inject unequal charge in the forward path, recreating a slight offset. However while the offset so injected by the opening of the switches of the first stage VGA1 will be amplified by the second stage VGA2 and introduced into the input of the third stage VGA3, the auto-zeroing process for the third stage VGA3 continues after the auto-zeroing switches for the first two stages are opened, so that the auto-zeroing of the third stage VGA3 zeros the effect of the injected offsets of the first two stages, ultimately leaving only the small offset injected by the auto-zeroing switches of the third stage, unamplified by the first two stages.

Figure 9:
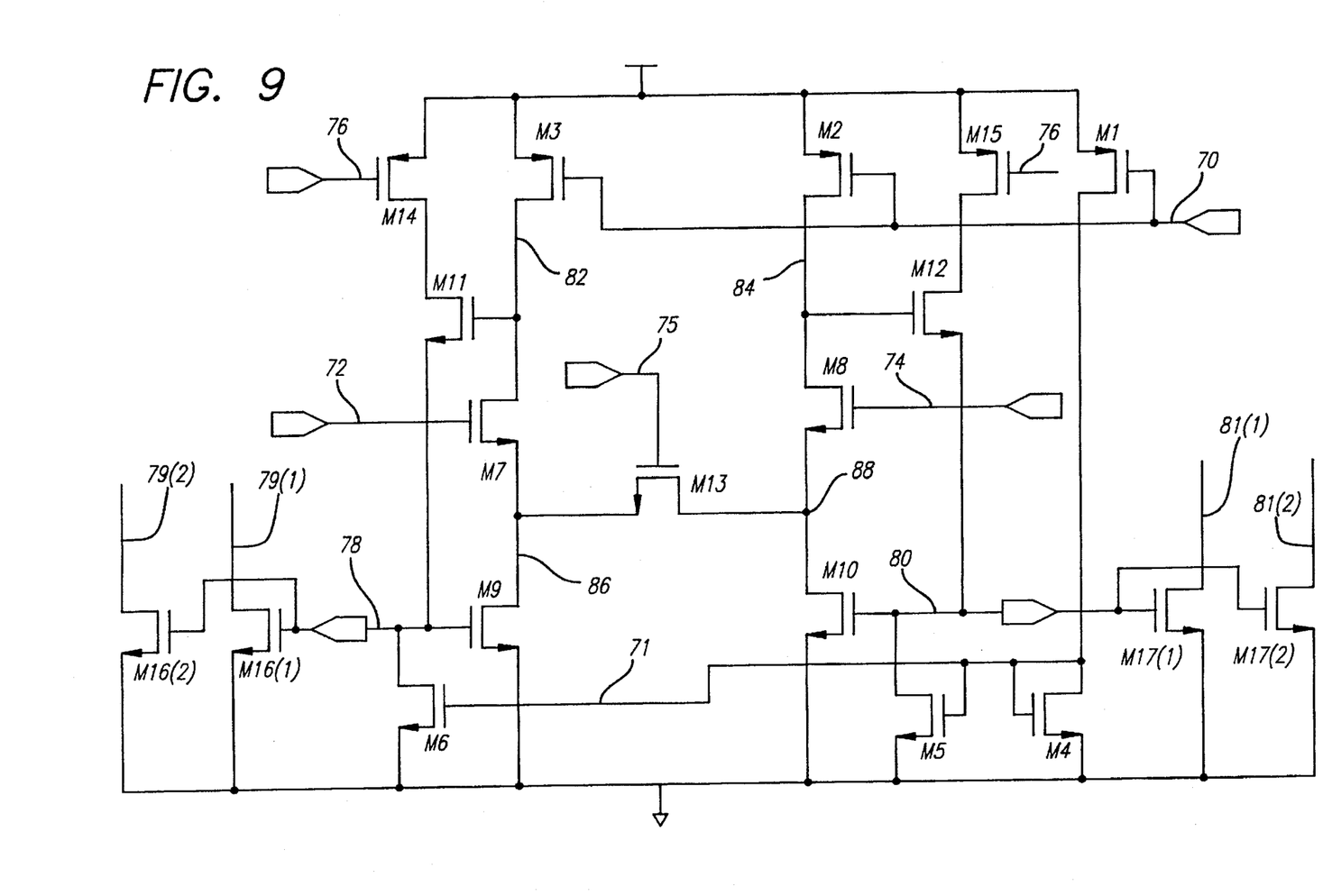
FIG. 9 is a circuit diagram of a representative transconductance amplifier of the variable gain amplifier chain.
Figure 10:
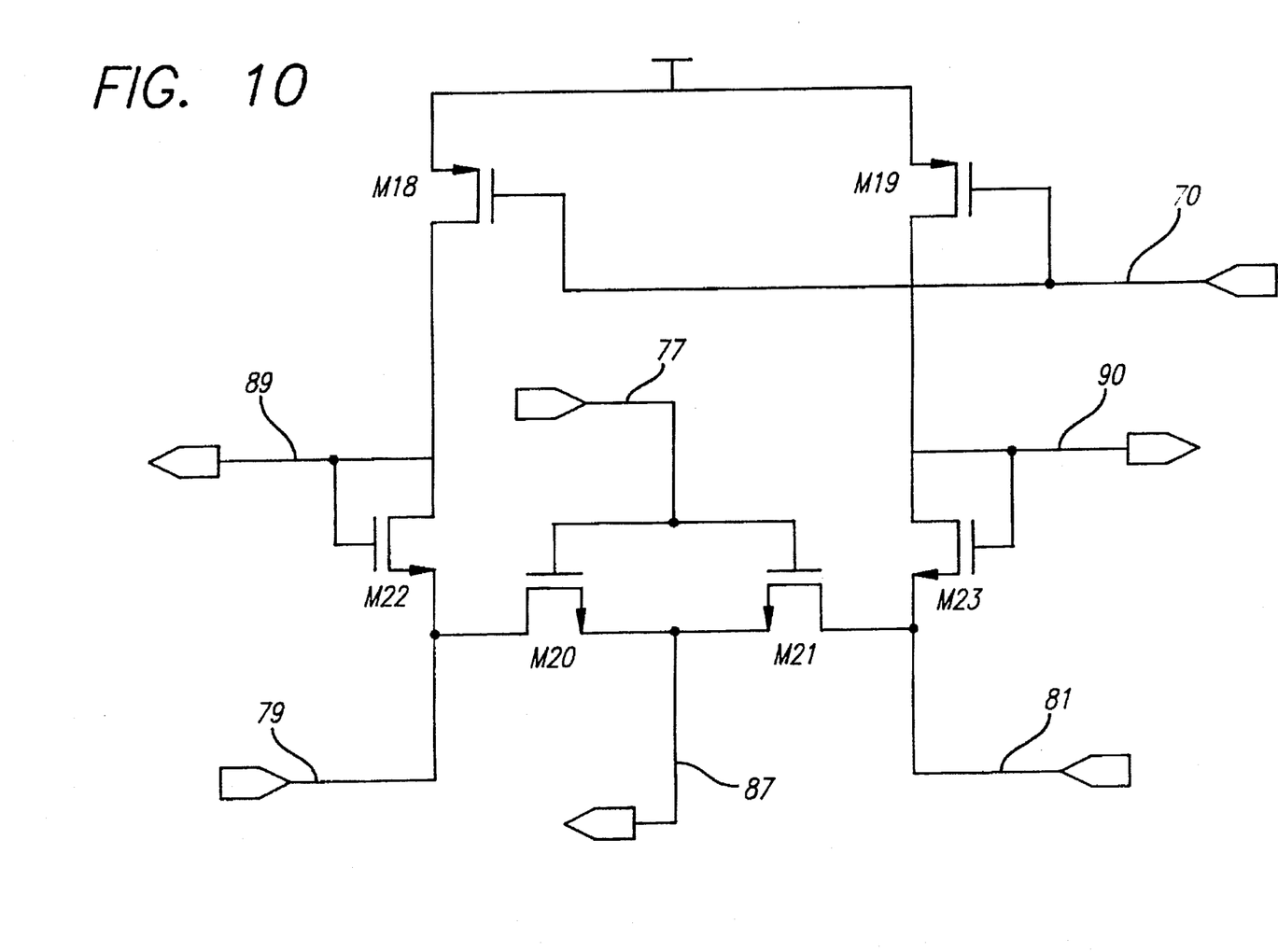
FIG. 10 is a circuit diagram for a representative R stage of the variable gain amplifier chain.

While the transconductance stages of the variable gain amplifiers in the preferred embodiment vary slightly, a representative gm stage may be seen in FIG. 9 and a representative R stage may be seen in FIG. 10. Referring first to FIG. 9, the voltage on line 70 is set from a current mirror in a bias circuit (not shown) to establish the desired constant current levels in devices M1, M2 and M3 by setting the gate-source voltage of these three devices, the currents particularly in devices M2 and M3 being equal. The current in device M4, being in series with device M1, is equal thereto, with device M4 mirroring the current there through to devices M5 and M6 by the common gate connections on line 71, the current in devices M5 and M6 being equal (M5 and M6, like M2 and M3, being identical devices). The differential input voltage is applied through lines 72 and 74 to the gates of devices M7 and M8, respectively. Since the gates of devices M11 and M12 require essentially no current, the current in M7 is the same as the current in M3, which in turn is equal to the current in device M2 and device M8. This in turn provides that the gate-source voltage of devices M7 and M8 are constant and equal, independent of the differential voltage applied to lines 72 and 74 (and neglecting any possible back gate effects, which are well understood and therefore will not be further described herein).

Device M13 has its gate connected to a reference voltage 75 set so that device M13 acts as a resistor of appropriate value. Since device M13 is connected between the sources of devices M7 and M8, the voltage across device M13 at any time will be equal to the differential voltage across lines 72 and 74, and accordingly the current through device M13 will be proportional to the differential voltage input on lines 72 and 74.

Devices M14 and M15 act as switches, and have their gates connected to a power-down signal pd on line 76 for controllably turning the circuit on and off. When on, devices M14 and M15 effectively connect the drains of devices M11 and M12, respectively, to the positive voltage supply.

When the input voltages on lines 72 and 74 are equal (zero differential input) and in the absence of offsets, there will be no voltage across device M13 and accordingly no current there through. In this condition, devices M3, M7, M9, M2, M8 and M10 all have the same magnitude of current there through. Similarly, devices M14, M11, M6, M15, M12 and M5 all have the same magnitude of current there through. The voltages on lines 78 and 80 are equal to each other and to the gate-source voltage of devices M9 and M10 for the magnitude of current there through. The voltages on lines 78 and 80 are connected to the gates of multiple devices M16 and M17, thereby mirroring the current through devices M9 and M10 of FIG. 9 to the multiple outputs 79 and 81 of multiple devices M16 and M17, respectively.

Assume that the voltage on line 72 now increases and the voltage on line 74 decreases by the same amount. The immediate effect is to turn device M7 on harder and to turn device M8 off somewhat. Since the currents in devices M2 and M3 do not change, the voltage of node 82 will drop because of device M7 now conducting more than device M3, and similarly the voltage of node 84 will increase because of device M8 now conducting less than device M2. The decrease in voltage of node 82 reduces the gate-source voltage of device M11, thereby reducing the current there through, with the constant current through device M6 pulling the gate of device M9 lower, thereby tending to reduce the current flow through device M9. As a result of device M7 being turned on harder, and particularly device M9 being turned off somewhat, the voltage of node 86 will increase, and similarly the voltage of node 88 will decrease by the same amount. The circuit will stabilize when the gate-source voltage of device M7 and device M8 are equal and appropriate to conduct the same amount of current, namely the current through current source devices M3 and M2. Because of the voltage now appearing across device M13, the same will conduct a current proportional thereto, so that the current through device M9 will be reduced and the current through M10 will be increased from the quiescent values thereof. Thus, the voltages on lines 78 and 80 will adjust accordingly to set the gate-source voltages of devices M9 and M10 as required for the now unequal currents there through. This mirrors the unequal currents through devices M9 and M10 to the multiple outputs 79 and 81 of multiple devices M16 and M17, respectively. For a fixed differential input voltage across lines 72 and 74, nodes 82 and 84 will settle at a voltage which sets the gate-source voltages of devices M11 and M12 so that the two have the same current there through, namely, the current through devices M5 and M6. The circuit is stable, and because all devices in the signal path are n-channel devices, the circuit is very fast, providing a high frequency response between the input voltages on lines 72 and 74 and the output currents through multiple devices M16 and M17.

Referring again to FIG. 9, it will be noted that two pairs of devices M16 and M17 are shown, providing two pairs of outputs 79 and 81. In some applications, only one pair of output current devices will be needed, though in other applications, multiple differential output current pairs may be desired to drive other circuits, each in some relative proportion to the first output of the transconductance amplifier. In the present case, the transconductance stage of the variable gain amplifier VGA2 (FIG. 2) uses two pair of output mirror devices M16 and M17, namely M16(1) and M17(1), and M16(2) and M17(2) as shown in FIG. 9. One pair forms the output to the transconductance stage of variable gain amplifier VGA2 and the other pair form the output of transconductance amplifier gm1 (FIGS. 5, 6 and 7) in the auto-zeroing feedback loop of variable gain amplifier VGA1. Similarly, the transconductance stage of the variable gain amplifier VGA3 uses two pair of output mirror devices M16 and M17, namely M16(1) and M17(1), and M16(2) and M17(2) as shown in FIG. 9. One pair forms the output to the transconductance stage of variable gain amplifier VGA3 and the other pair form the output of transconductance amplifier gm1 (FIGS. 5, 6 and 7) in the auto-zeroing feedback loop of variable gain amplifier VGA2.

Referring now to FIG. 10, devices M18 and M19 are also connected through line 70 to a reference voltage so as to be biased to act as current sources. Similarly, devices M20 and M21 have their gates connected to an appropriate bias on line 77 to bias the same as resistors, with a common mode sense connection on line 87 providing a common mode voltage level sensing node for feedback to circuitry (not shown because such circuitry is well known) for controlling the common mode voltage levels of the system. Finally, devices M22 and M23 have their gates and drains connected together, with the differential outputs on lines 89 and 90 being taken from the drain-gate connections of the respective devices. In operation, the difference in currents between devices M16 and M17 on lines 79 and 81, respectively, of FIG. 9 becomes the current through devices M20 and M21 of FIG. 10. Because the currents through devices M22 and M23 are equal, the gate-source voltage of these devices are also equal, so that the differential voltage across devices M20 and M21 is reflected by the devices M22 and M23 as the differential output voltage on lines 89 and 90.

The resistance presented by devices M20 and M21 and the apparent resistance of the circuit is approximately inversely proportional to the amount the voltage on line 77 exceeds the threshold of devices M20 and M21. Thus, the circuit transfer function of $V_o/I_{in}$ is approximately inversely proportional to the amount the voltage on line 77 exceeds the threshold of devices M20 and M21.

Referring again to FIG. 2, it may be seen that the low pass filter 26, the level shift and high pass filter 28, the timing generator 30 and the servo bit detector 34 all additionally participate in the auto-zeroing process. By way of example, in the low pass filter 26, an internal node in the filter is disconnected and zeroed responsive to the signal FAZ. Then the resulting offsets at the outputs of the level shift and high pass filter 28, the amplifiers in the zero phase restart circuit and the servo bit detector 34 are zeroed responsive to the signal AZ2, the respective auto-zeroing switches again being opened by AZ2 before the internal node in the filter is reconnected to the forward signal path.

One circuit within which a different and special circuit for offset compensation is provided is in the A/D converter circuit 32. As shown in FIG. 2, a seven bit offset compensation is provided to a summing point 106 prior to the input to the six bit A/D converter 32. The analog-to-digital converter 32 is a flash analog-to-digital converter.

Figure 11:
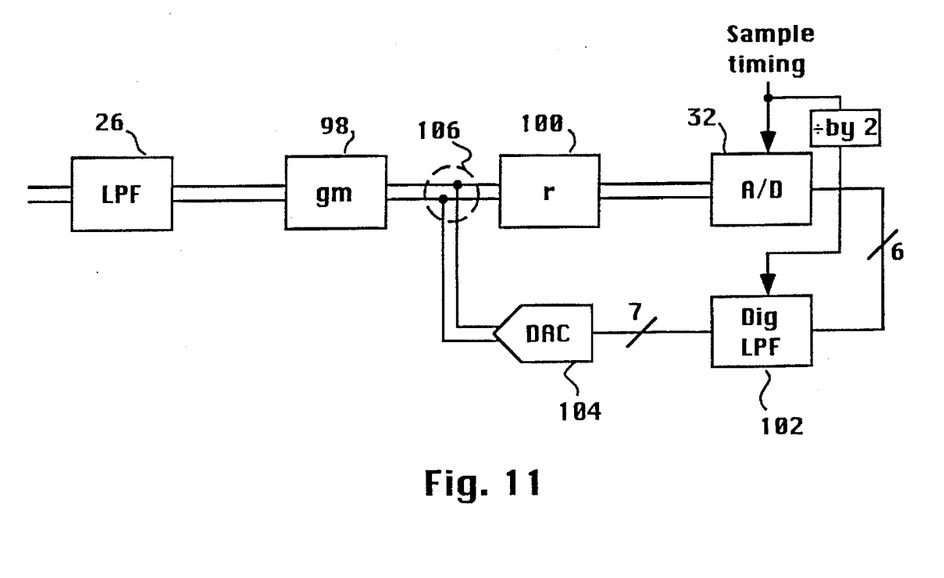
FIG. 11 is a block diagram of the residual offset compensation used with the analog-to-digital converter circuitry in the present invention.

Because the data detection on the digitized read channel signal from the A/D converter circuit 32 can be sensitive to offsets, particularly with the partial response most likelihood detection circuitry used with the preferred embodiment, and because the dynamic range of the A/D converter is limited, the offsets to and within this circuit are canceled (actually grossly decreased) as suggested by the seven bit offset register and DAC shown in FIG. 2, and as shown in greater detail in FIG. 11. In particular, the output of the low pass filter circuit 26 is amplified by transconductance stage 98 in FIG. 11 and converted to a voltage by a resistor stage 100 to provide a voltage input to the six bit A/D converter 32, with the six bit output of the A/D converter being applied to a digital filter 102. The output of the digital filter 102 is a seven bit signal (the value in the 7 bit offset register of FIG. 2) which is reconverted to analog form by digital-to-analog converter 104 (DAC of FIG. 2) to provide differential offset correcting currents to the differential current output of the transconductance stage 98 at summing junction 106. The digital low pass filter 102 is a 2-pole programmable IIR filter (infinite impulse response filter). Of course, being a low pass filter, the contribution of the output to the offset correction at any one sample time will be relatively low, the filter acting in part as an integrator (in the preferred embodiment, an integrator plus a somewhat lossy integrator) to accumulate the offset contributions over many sample times for the cancellation thereof. The inclusion of this offset correction loop also provides a real time low frequency noise rejection capability, constantly minimizing low frequency noise such as 1/f noise. In general, a lossy integrator refers to a device or circuit which acts as an integrator at all but very low frequencies, such as a capacitor with a a very high value resistor in parallel therewith.

Because of the very fast auto-zeroing achievable with the present invention, much of the read channel electronics shown in FIG. 2 may be powered down whenever a signal is not being read. This may include times when a sector is not being read, when not servoing or even during gaps between fields. Specifically in the preferred embodiment, there are three conditions to be considered. First, the three VGA stages 22 and the low pass filter 26 are powered down when both read gate and servo gate are low, and powered up when either or both read gate and/or servo gate are high. Second, the servo AGC 38, servo demodulator 36 and servo bit detector 34 are powered up only when servo gate is high. Third, the timing generator 30 and the analog-to-digital converter 32 are powered up only when read gate is high. In the preferred embodiment, the common mode circuit 40 is not powered down because of the large coupling capacitors 24 coupling the signal from the preamplifiers to the common mode circuit and the resulting long settling times for the turn-on transients.

While a preferred embodiment of the present invention has been disclosed and described in detail herein, it will be obvious to those skilled in the art that various changes in form and detail may be made therein without departing from the spirit and scope thereof.

We claim:

1. In a read channel integrated circuit having a signal path for receiving and processing an analog read signal from a storage device, a method of reducing offsets caused by elements of the read channel integrated circuit comprising the steps of:

zeroing the analog read signal applied to the signal path at a first location in the read channel integrated circuit signal path;

coupling a signal from a second location to an integrating storage means, said second location being in the signal path further along the signal path than the first location, and feeding back the signal stored in the integrating storage means to the signal path at a location between the first and the second locations;

decoupling the signal at the second location from the integrating storage means; and, removing the zeroing of the analog read signal applied to the signal path.

2. The method of claim 1 wherein the signal path is a differential signal path.

3. The method of either of claims 1 or 2 wherein the signal path between the first and second locations is an analog signal signal path.

4. The method of claim 3 wherein the integrating storage means is at least one on-chip capacitor.

5. The method of claim 2 wherein the signal path between the first and second locations is an analog signal signal path, and wherein the storage means comprises a pair of on-chip capacitors.

6. The method of claim 5 wherein the signal path includes an amplifier between the first and second locations.

7. The method of claim 5 wherein the signal path includes at least one low pass filter between the first and second locations.

8. In a read channel integrated circuit having a signal path for receiving and processing an analog read signal from a storage device, a method of reducing offsets caused by a series of elements of the read channel integrated circuit comprising the steps of:

zeroing the analog read signal applied to the signal path at a first location in the read channel integrated circuit signal path;

coupling a signal from a second location to a first integrating storage means, said second location being in the signal path further along the signal path than the first location, and feeding back the signal stored in the first integrating storage means to the signal path at a location between the first and the second locations;

coupling a signal from a third location to a second integrating storage means, said third location being in the signal path further along the signal path than the second location, and feeding back the signal stored in the second integrating storage means to the signal path at a location between the second and the third locations;

decoupling the signal at the second location from the first integrating storage means, and thereafter, decoupling the signal at the third location from the second integrating storage means; and, removing the zeroing of the analog read signal applied to the signal path.

9. The method of claim 8 wherein the signal path is a differential signal path.

10. The method of either of claims 8 or 9 wherein the signal path between the first and second locations is an analog signal signal path.

11. The method of claim 10 wherein the integrating storage means is at least one on-chip capacitor.

12. The method of claim 9 wherein the signal path between the first and second locations is an analog signal signal path, and wherein the storage means comprises a pair of on-chip capacitors.

13. The method of claim 12 wherein the signal path includes an amplifier between the first and second locations.

14. A read channel integrated circuit having a signal path for receiving and processing an analog read signal from a storage device comprising:

means for controllably zeroing the analog read signal applied to the signal path at a first location in the read channel integrated circuit signal path;

means for controllably coupling a signal from a second location to an integrating storage means, said second location being in the signal path further along the signal path than the first location;

means for feeding back the signal stored in the integrating storage means to the signal path at a location between the first and the second locations.

15. The read channel of claim 14 wherein the signal path is a differential signal path.

16. The read channel of either of claims 14 or 15 wherein the signal path between the first and second locations is an analog signal signal path.

17. The read channel of claim 16 wherein the integrating storage means is at least one on-chip capacitor.

18. The read channel of claim 15 wherein the signal path between the first and second location is an analog signal signal path, and wherein the storage means comprises a pair of on-chip capacitors.

19. The read channel of claim 18 wherein the signal path includes an amplifier between the first and second locations.

20. The read channel of claim 18 wherein the signal path includes at least one low pass filter between the first and second locations.

21. A read channel integrated circuit having a signal path for receiving and processing an analog read signal from a storage device comprising:

means for controllably zeroing the analog read signal applied to the signal path at a first location in the read channel integrated circuit signal path;

means for controllably coupling a signal from a second location to a first integrating storage means, said second location being in the signal path further along the signal path than the first location, the signal stored in the first integrating storage means being fed back as negative feedback to the read channel signal at a location ranging from the first to the second locations;

means for controllably coupling a signal from a third location to a second integrating storage means, said third location being in the signal path further along the signal path than the second location, the signal stored in the second integrating storage means being fed back as negative feedback to the read channel signal at a location between the second and the third locations.

22. The read channel of claim 21 wherein the signal path is a differential signal path.

23. The read channel of either of claims 21 or 22 wherein the signal path between the first and second locations is an analog signal signal path.

24. The read channel of claim 23 wherein the integrating storage means is at least one on-chip capacitor.

25. The read channel of claim 22 wherein the signal path between the first and second locations is an analog signal path, and wherein the storage means comprises a pair of on-chip capacitors.

26. The read channel of claim 25 wherein the signal path includes an amplifier between the first and second locations.

* * * * *

UNITED STATES PATENT AND TRADEMARK OFFICE
CERTIFICATE OF CORRECTION

PATENT NO. : 5,648,738
DATED : July 15, 1997
INVENTOR(S) : Welland et al.

It is certified that error appears in the above-identified patent and that said Letters Patent is hereby corrected as shown below:

In the title page, item 56, OTHER PUBLICATIONS, please delete " No Month ".

In column 1 at line 9, please delete " thread " and insert -- the read --.

In column 5 at line 49, please delete " T " and insert -- $\tau$ --.

In column 12, claim 18 at line 2, please delete " location " and insert -- locations --.

Signed and Sealed this

Second Day of February, 1999

Attest:

Attesting Officer

*Acting Commissioner of Patents and Trademarks*